(12) United States Patent
Bangalore Sadashiv Singh

(10) Patent No.: US 11,508,126 B2
(45) Date of Patent: Nov. 22, 2022

(54) RENDERING PATHWAYS FOR VIRTUAL TOUR

(71) Applicant: Arvind Prakash Bangalore Sadashiv Singh, Bangalore (IN)

(72) Inventor: Arvind Prakash Bangalore Sadashiv Singh, Bangalore (IN)

( * ) Notice: Subject to any disclaimer, the term of this patent is extended or adjusted under 35 U.S.C. 154(b) by 0 days.

(21) Appl. No.: 17/294,651

(22) PCT Filed: Nov. 15, 2019

(86) PCT No.: PCT/IN2019/050845
§ 371 (c)(1),
(2) Date: May 17, 2021

(87) PCT Pub. No.: WO2020/100166
PCT Pub. Date: May 22, 2020

(65) Prior Publication Data
US 2022/0012946 A1 Jan. 13, 2022

(30) Foreign Application Priority Data
Nov. 15, 2018 (IN) .............................. 201841018155

(51) Int. Cl.
*G06T 19/00* (2011.01)
*G06F 3/01* (2006.01)
*G06F 3/04815* (2022.01)
*G06T 19/20* (2011.01)

(52) U.S. Cl.
CPC ............ *G06T 19/003* (2013.01); *G06F 3/013* (2013.01); *G06F 3/017* (2013.01); *G06F 3/04815* (2013.01); *G06T 19/20* (2013.01)

(58) Field of Classification Search
None
See application file for complete search history.

(56) References Cited

U.S. PATENT DOCUMENTS

2015/0269785 A1* 9/2015 Bell ........................ G06T 15/20
345/427
2018/0306588 A1* 10/2018 Bjorke ................. G01C 21/206

OTHER PUBLICATIONS https://en.wikipedia.org/w/index.php?title=Pathfinding&oldid=868611433 (Year: 2018).*
https://en.wikipedia.org/w/index.php?title=Panorama&oldid=866438500 (Year: 2018).*

* cited by examiner

*Primary Examiner* — Vu Nguyen
(74) *Attorney, Agent, or Firm* — Maschoff Brennan

(57) ABSTRACT

Methods and systems of rendering a pathway for a virtual tour of a predefined premises are disclosed. A method includes receiving a three-dimensional floor plan of the predefined premises, generating the virtual tour of the predefined premises based on the three-dimensional floor plan, identifying a plurality of pathways within the three-dimensional floor plan for exploring the predefined premises, and receiving details pertaining to a position and orientation of the user during the virtual tour. The position and the orientation are detected by at least one sensor of a Virtual Reality (VR) enabled device of the user. The method includes selecting a pathway based on the position and the orientation of the user, and rendering the pathway to the VR-enabled device for the virtual tour.

12 Claims, 14 Drawing Sheets

RENDERING PATHWAYS FOR VIRTUAL TOUR

FIELD OF THE INVENTION

The present disclosure relates to virtual tours and more particularly, relates to systems and methods for rendering pathways for a virtual tour in a predefined premises.

BACKGROUND

Typically, in the realm of real estate, building construction, and interior designing, a property, such as a house and an office, is shown to a customer by using images, video clips or an actual visit to the site. Each of these methods involves certain shortcomings. For example, in case of viewing the images and the video clips of the site, the customer may not get a realistic experience and miss the finer details of the project. On the other hand, providing a visit of a site to every customer is an expensive and time consuming exercise and may not therefore be feasible.

In the recent times, with the advent of Virtual Reality (VR) technologies, virtual tours are increasingly being used in various fields, including real estate. As is generally known, a virtual tour is an organized trip, made up from a series of 360 degree images or videos stitched together for generating an interactive 3D panoramic view. The virtual tour provides a virtual view or a virtual walk experience of a selected space to a user with detailed understanding. In order to facilitate such virtual tours for the users, cameras mounted at predefined angles at the site continuously capture the three dimensional images and render the same on a VR headset worn by a user. As would be appreciated, the VR technology of course offers various advantages over the traditional methods, at least in terms of providing a realistic experience to the user and that too, without requiring the physical presence of the user at the site.

However, virtual tours of a property often pose certain challenges as well. Considering that the virtual tour is a timed predefined sequence of video frames, a user viewing the video content through the VR headset is required to follow the timed sequence of video being rendered. The user doesn't have the liberty to alter or modify the tour based on his/her preference. For example, when 3D virtual tour of a furnished property is rendered on the VR headset, the user may want to spend some time viewing and reviewing a specific portion of the site, say, the user may want to examine the furniture. In another example, the user may get obstructed by the furniture and walls while the content is being rendered on the VR headset. In such situations, the user is then required to reposition himself/herself and resume the video from the next frame or restart the entire experience once again.

Such repositioning directly leads to loss of continuity in the user experience. Therefore, the user may still not get the wholesome experience of visiting the site, even with the existing VR techniques, for example, owing to abovementioned disruptions. Moreover, the virtual tours as rendered by the existing techniques may cause inconvenience to the user while reviewing the site.

In order to solve at least one of the above mentioned problems, there exists a need for providing a seamless user experience while navigating through a virtual reality tour.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

In an embodiment of the present disclosure, a method of rendering a pathway for a virtual tour of a predefined premises is disclosed. The method includes receiving, by a receiving module, a three-dimensional floor plan of the predefined premises, and generating, by generating module, the virtual tour of the predefined premises, based on the three-dimensional floor plan. The virtual tour is generated by retrieving a plurality of images captured from predefined angles within the three dimensional floor plan, and stitching the plurality of images to generate the virtual tour. The method includes identifying, by an identifying module, a plurality of pathways within the three-dimensional floor plan for exploring the predefined premises. A pathway is indicative of a visual, tactile or audio guidance provided to a user for navigating from a starting point to a destination point within the virtual tour. Further, the method includes receiving, by the receiving module, details pertaining to a position and orientation of the user during the virtual tour. The position and the orientation are detected by at least one sensor of a Virtual Reality (VR) enabled device of the user. The method then includes selecting, by a selecting module, a pathway, from among the plurality of pathways, based on the position and the orientation of the user, and rendering, by a rendering module, the pathway to the VR-enabled device for the virtual tour.

In another embodiment of the present disclosure, a system of rendering a pathway for a virtual tour of a predefined premises is disclosed. The system includes a receiving module adapted to receive a three-dimensional floor plan of the predefined premises and a generating module in communication with the receiving module and adapted to generate the virtual tour of the predefined premises, based on the three-dimensional floor plan. The virtual tour is generated by retrieving a plurality of images captured from predefined angles within the three dimensional floor plan, and stitching the plurality of images to generate the virtual tour. The system includes an identifying module in communication with the generating module and adapted to identify a plurality of pathways within the three-dimensional floor plan for exploring the predefined premises. A pathway is indicative of a visual, tactile or audio guidance provided to a user for navigating from a starting point to a destination point within the virtual tour. The system further includes the receiving module adapted to receive details pertaining to a position and orientation of the user during the virtual tour. The position and the orientation are detected by at least one sensor of a Virtual Reality (VR) enabled device of the user. The system includes a selecting module in communication with the receiving module and adapted to select a pathway, from among the plurality of pathways, based on the position and the orientation of the user. Further, the system includes a rendering module in communication with the selecting module and adapted to render the pathway to the VR-enabled device for the virtual tour.

To further clarify advantages and features of the present invention, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
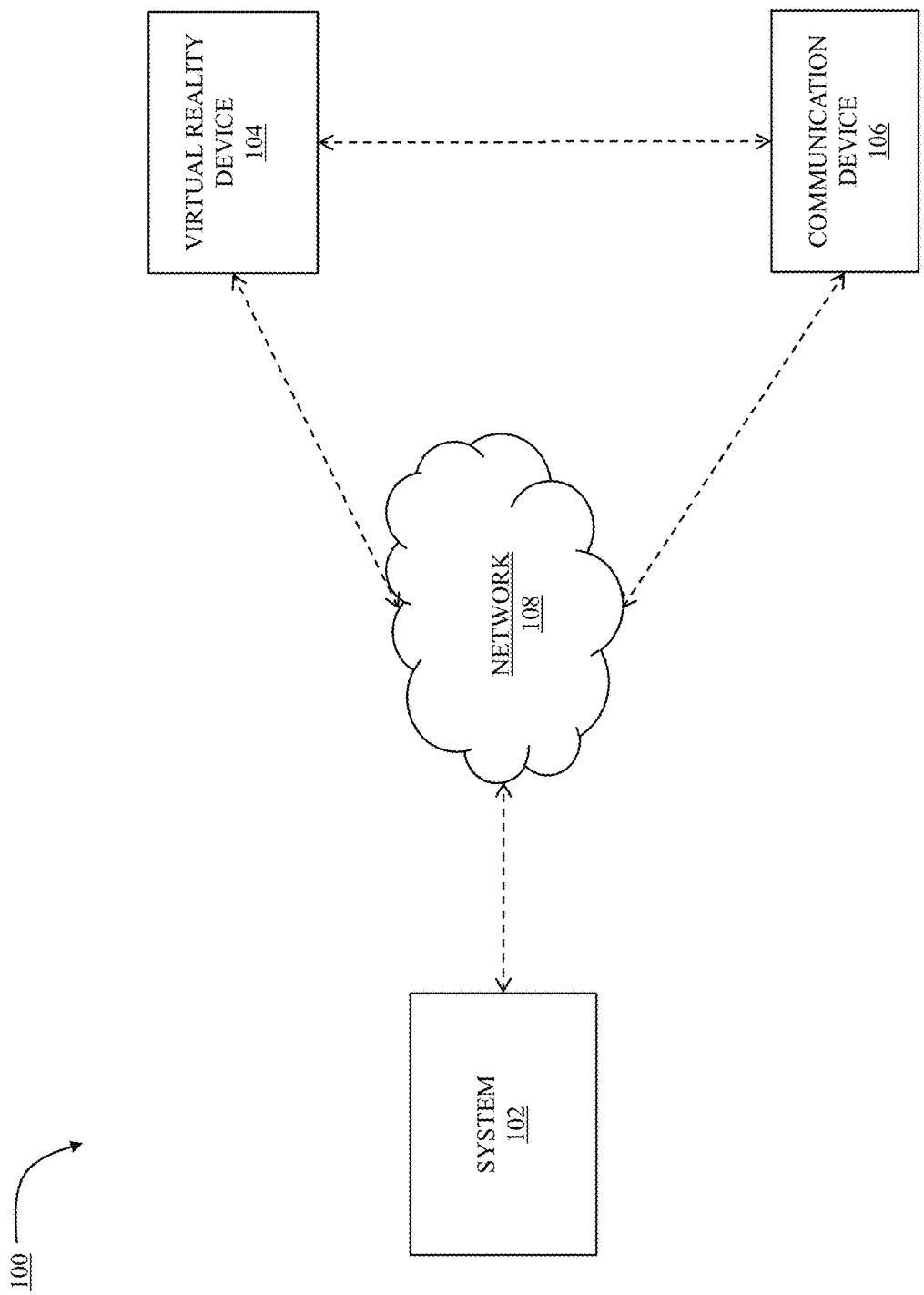
FIG. 1 illustrates an environment for implementation of systems and methods of rendering a pathway for a virtual tour of a predefined premises, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE DRAWINGS

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

FIG. 1 illustrates an environment 100 for implementation of systems and methods of rendering a pathway for a virtual tour of a predefined premises, according to an embodiment of the present disclosure. In an embodiment, a system 102 may be in communication with a Virtual Reality (VR) enabled device 104 and a communication device 106 through a network 108. In an embodiment, the network 108 may be a wireless network or a wired network, without departing from the scope of the present disclosure.

The system 102 may be adapted to render the pathway for the virtual tour of the predefined premises. In an embodiment, the system 102 may be hosted on a cloud network. Further, the system 102 may be accessible to one or more users via an interface provided on the communication device 106. Constructional and operational features of the system 102 are explained in detail at least in the description of FIG. 2. The system 102 may render the pathway on the VR-enabled device 104.

The VR-enabled device 104 may be adapted to be used by a user to take the virtual tour of the predefined premises, based on the pathway as rendered by the system 102. In an embodiment, the VR-enabled device 104 may include, but is not limited to, a VR-enabled headset. In another embodiment, the VR-enabled device 104 may include, but is not limited to, a computing device, such as smartphone, laptop, and a desktop.

In an embodiment, the VR-enabled device 104 may include a display unit, one or more sensors, and at least one Input-Output device. The display unit may be adapted to render 360 degree virtual tour of the predefined premises. Further, the sensors may detect a position and orientation of the user. In an embodiment, the sensors may detect user movement and hand gestures. In an embodiment, the user may select the predefined premises to be viewed by using hand gestures, which may be detected by the sensors. In an embodiment, the user movement and hand gestured may be continuously monitored during the virtual tour of the user. Further, the at least one input-output device may be adapted to provide at least one of an audio signal, a video signal, and a tactile signal for navigating during the virtual tour of the predefined premises.

Further, the communication device 106 may be used to avail different functionalities of the system 102. In an embodiment, the communication device 106 may include a dedicated application for interacting with the system 102. In an embodiment, the application may be used to browse, search, and select one or more predefined premises to be viewed in the VR-enabled device 104. In an embodiment, the communication device 106 may include, but is not limited to, a smartphone, a tablet, a laptop, and a personal computer. In an embodiment, the communication device 106 may also be used to operate the VR-enabled device 104. The communication device 106 may be adapted to be connected to the VR-enabled device 104 through one of a Bluetooth®, Local Area Network (LAN), and Wide Area Network (WAN).

Figure 2:
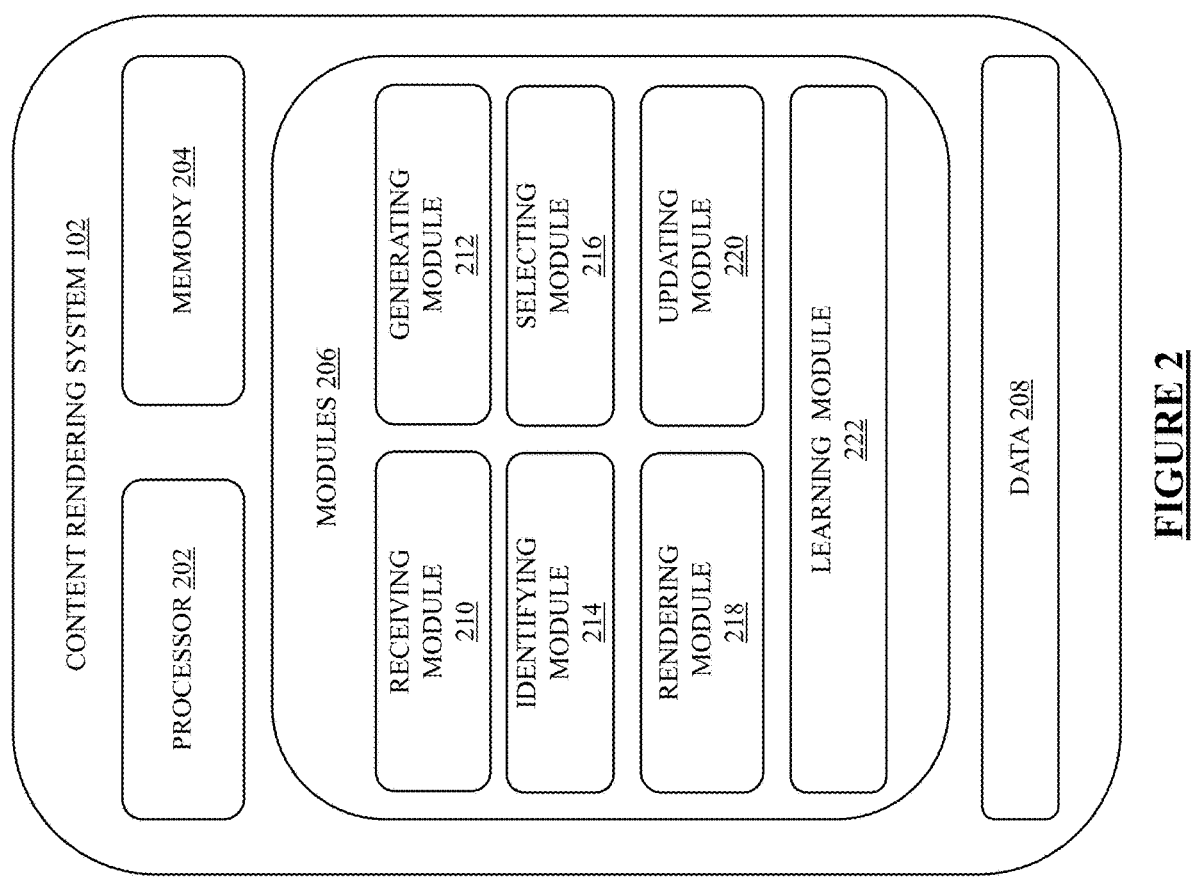
FIG. 2 illustrates a block diagram of a system of rendering a pathway for the virtual tour of the predefined premises, according to an embodiment of the present disclosure.

FIG. 2 illustrates a block diagram of the system 102, according to an embodiment of the present disclosure. The system 102 may include a processor 202, a memory 204, modules 206, and data 208. The modules 206 and the memory 204 are coupled to the processor 202. The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules 206, amongst other things, include routines, programs, objects, components, data structures, etc., which perform particular tasks or implement data types. The modules 206 may also be implemented as, signal processor(s), state machine(s), logic circuitries, and/or any other device or component that manipulate signals based on operational instructions.

Further, the modules 206 can be implemented in hardware, instructions executed by a processing unit, or by a combination thereof. The processing unit can comprise a computer, a processor, such as the processor 202, a state machine, a logic array or any other suitable devices capable of processing instructions. The processing unit can be a general-purpose processor which executes instructions to cause the general-purpose processor to perform the required tasks or, the processing unit can be dedicated to perform the required functions. In another embodiment of the present disclosure, the modules 206 may be machine-readable instructions (software) which, when executed by a processor/processing unit, perform any of the described functionalities.

In an implementation, the modules 206 may include a receiving module 210, a generating module 212, an identifying module 214, a selecting module 216, a rendering module 218, an updating module 220, and a learning module 222. The receiving module 210, the generating module 212, the identifying module 214, the selecting module 216, the rendering module 218, the updating module 220, and the learning module 222 may be in communication with each other. Further, the data 208 serves, amongst other things, as a repository for storing data processed, received, and generated by one or more of the modules 206. In an embodiment, the details pertaining to the modules 206 may be stored as data 208 in the memory 204.

In an embodiment, the receiving module 210 may be adapted to receive a three-dimensional floor plan of the predefined premises. In another embodiment, the receiving module 210 may receive a two-dimensional floor plan of the predefined premises. In an embodiment, the two-dimensional floor plan may be received from the communication device 106. In an embodiment, one or more drawing tools may be provided to the user through a user interface on the communication device 106 for creating or editing the two-dimensional floor plan. Further, the receiving module 210 may generate the three-dimensional floor plan, based on the two-dimensional floor plan. In an embodiment, the receiving module 210 may be in communication with the generating module 212.

The generating module 212 may be adapted to generate the virtual tour of the predefined premises, based on the three-dimensional floor plan. In an embodiment, in order to generate the virtual tour, the generating module 212 may first retrieve a plurality of images captured from predefined angles within the three dimensional floor plan. In an embodiment, the generating module 212 may be in communication with at least one camera installed at the predefined premises. The at least one camera may capture the images, which may then be retrieved by the generating module 212. Further, the generating module 212 may stitch the images to generate the virtual tour. In an embodiment, the generating module 212 may be in communication with the identifying module 214.

The identifying module 214 may be adapted to identify a plurality of pathways within the three-dimensional floor plan for exploring the predefined premises. In an embodiment, a pathway is indicative of a visual, tactile or audio guidance provided to the user for navigating from a starting point to a destination point within the virtual tour. In an embodiment, the identifying module 214 may be adapted to identify the plurality of pathways, based on identification of obstruction in the three-dimensional floor plan. The obstruction may include, but is not limited to, furniture, walls, stairs, and doors.

In an example, the identifying module 214 may identify the plurality of pathways to navigate the user from a current frame to the next most appropriate frame sequence in the virtual tour. For example, the user could not find a path to navigate from a frame n1 to a frame n2, where the frame n1 depicts a portion of a drawing room of the predefined premises and the frame n2 depicts a portion of the kitchen of the predefined premises. In such cases, the identifying module 214 may identify the plurality of pathways for navigating the user to the portion depicted in the frame n2.

Further, in an embodiment, the identifying module 214 may identify the plurality of pathways such that the pathways effective show the products inside the predefined premises to the user. Therefore, rather than identifying the shortest pathways between two locations in the predefined premises, the identifying module 214 identifies the pathways such the user gets to view the products. In an embodiment, the identifying module 214 may identify the plurality of pathways, based on dimensions of the predefined premises and the products-of-interest.

Further, the receiving module 210 may be adapted to receive details pertaining to the position and orientation of the user during the virtual tour. In an embodiment, the position and the orientation of the user may be detected by at least one sensor of a VR-enabled device 104 of the user. In an embodiment, the position and the orientation may be detected corresponding to a frame sequence of the virtual tour being rendered. In an embodiment, the receiving module 210 may be communication with the selecting module 216.

The selecting module 216 may be adapted to select a pathway, from among the plurality of pathways, based on the position and the orientation of the user. In an embodiment, the selecting module 216 may be in communication with the rendering module 218.

The rendering module 218 may be adapted to render the pathway to the VR-enabled device 104 for the virtual tour. In one example, once the pathway is rendered, a visual arrow mark is superimposed on the virtual tour corresponding to the position and orientation of the user so as to direct the user to the content on the next frame. In an example, an audio command is played so as to guide the user to the content on the next frame. In an embodiment, the rendering module 218 may be in communication with the generating module 212.

In an embodiment, the generating module 212 may be adapted to generate a score for each of the plurality of pathways. The rendering module 218 may then select the pathway with the highest score for rendering to the VR-enabled device 104.

Further, in an embodiment, the receiving module 210 may be adapted to receive a user instruction indicative of one of adding, removing, and modifying an item during the virtual tour. In an embodiment, the user instruction may be received through the communication device 106. The receiving module 210 may be in communication with the updating module 220. Based on the instruction, the updating module 220 may be adapted to update the pathway and render the updated pathway to the VR-enabled device 104. In an embodiment, the updating module 220 may be adapted to update the pathway in real-time. Therefore, the updating module 220 may update the pathway being rendered to the VR-enabled device 104 in real-time.

In another embodiment, the at least one sensor of the VR-enabled device 104 may detect at least one predefined user gesture. In such an embodiment, the receiving module 210 may be adapted to receive details indicative of the at least one predefined user gesture. In an embodiment, the at least one predefined user gesture may include, but is not limited to, hand movements and eyeball movements. In one example, during a ten minute video virtual tour, the user makes a gesture at the second minute frame or no eyeball movement is detected for a predefined time duration by the at least one sensor. In such examples, the at least one sensor may transfer the details relating to the detection of the gesture or the inactivity of the eyeball to the receiving module 210. The details may include, but are not limited to, a time period of inactivity and the video frame sequence during such time period. In such an embodiment, the updating module 220 may be adapted to update the pathway being rendered to the VR-enabled device 104 based on the at least one predefined user gesture.

In an embodiment, the receiving module 210, the generating module 212, the identifying module 214, the selecting module 216, the rendering module 218, and the updating module 220 may be in communication with the learning module 222. The learning module 222 may monitor the operation of these modules for rendering the pathway for the virtual tours of the user over a period of time. Further, based on the monitoring over the period of time, the learning module 222 may improve the outcome of the system 102, for example, generation of the plurality of pathways and selection of the pathway based on the position and orientation of the user. Therefore, with each cycle of operation of the system 102, an overall accuracy of the system 102 keeps increasing as the system 102 learns with each cycle of operation.

In an example, the pathways may be identified based on showcasing of the products within the predefined premises. The showcasing of the products may be defined based on different types of perspectives that can be used in the virtual tour or an interior walkthrough. In an embodiment, the perspectives may include a one-point perspective, a two-point perspective, and a three-point perspective.

Figure 3:
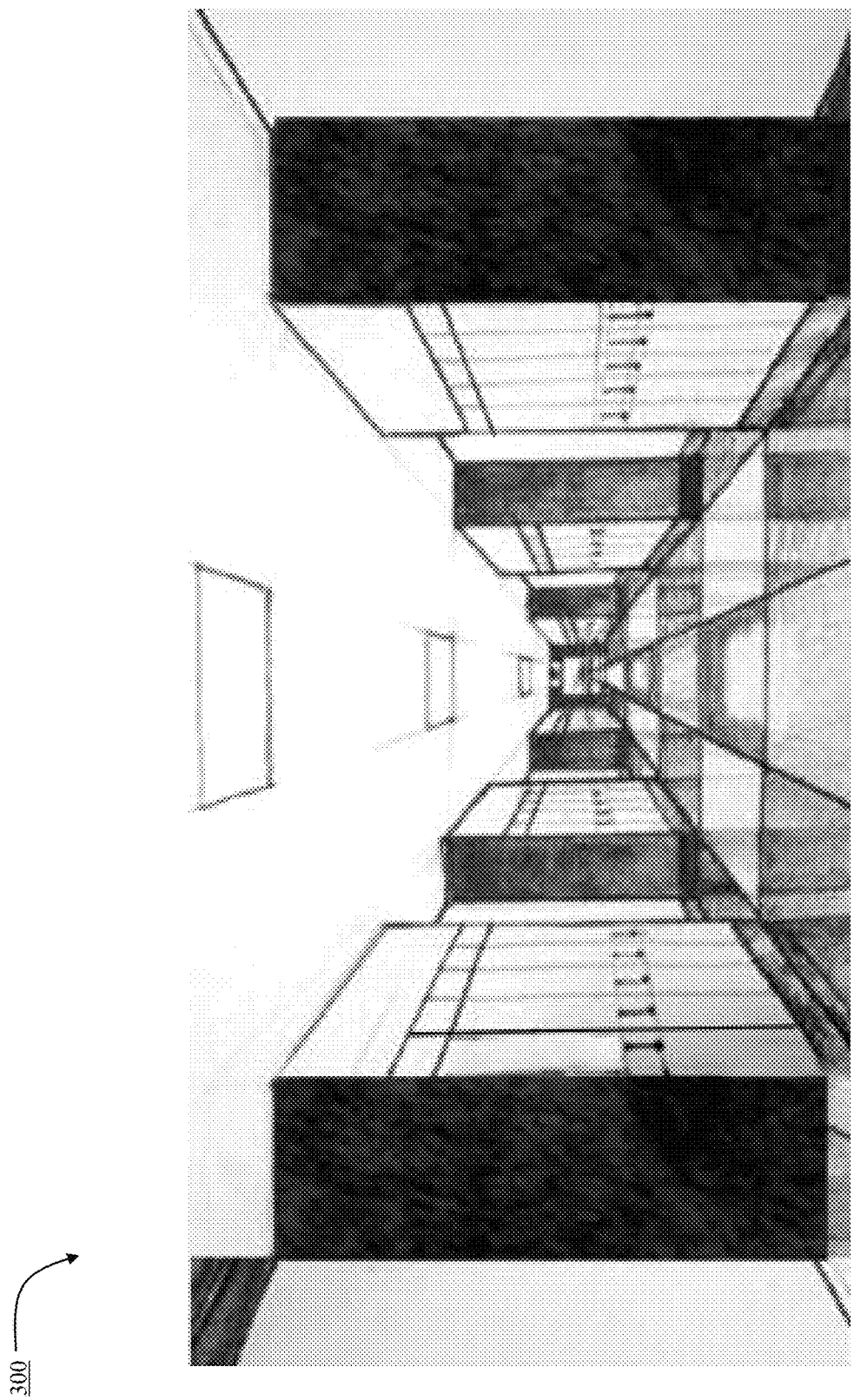
FIG. 3 illustrates an example depicting one-point perspective, according to an embodiment of the present disclosure.
Figure 4:
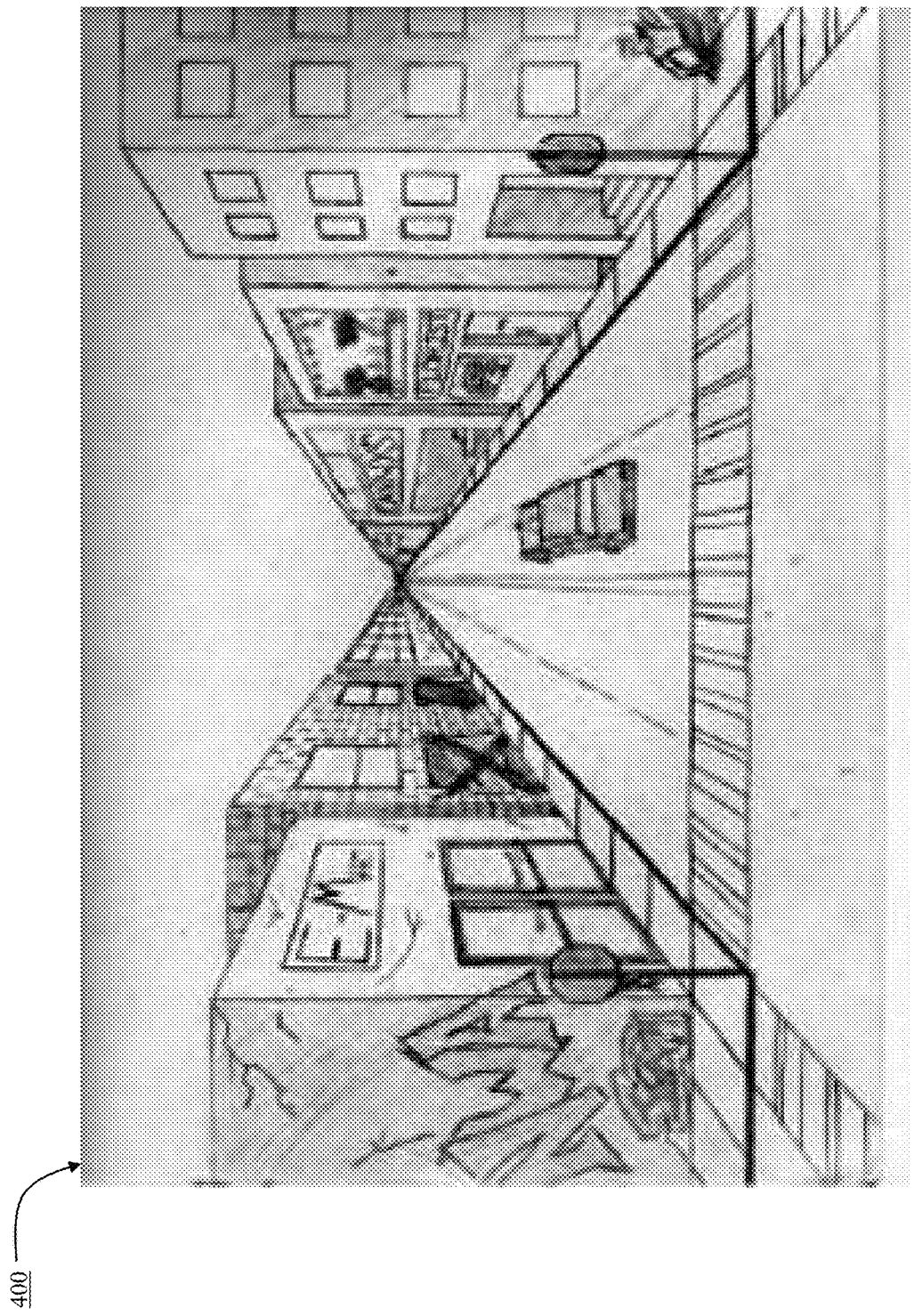
FIG. 4 illustrates another example depicting the one-point perspective, according to an embodiment of the present disclosure.
Figure 5:
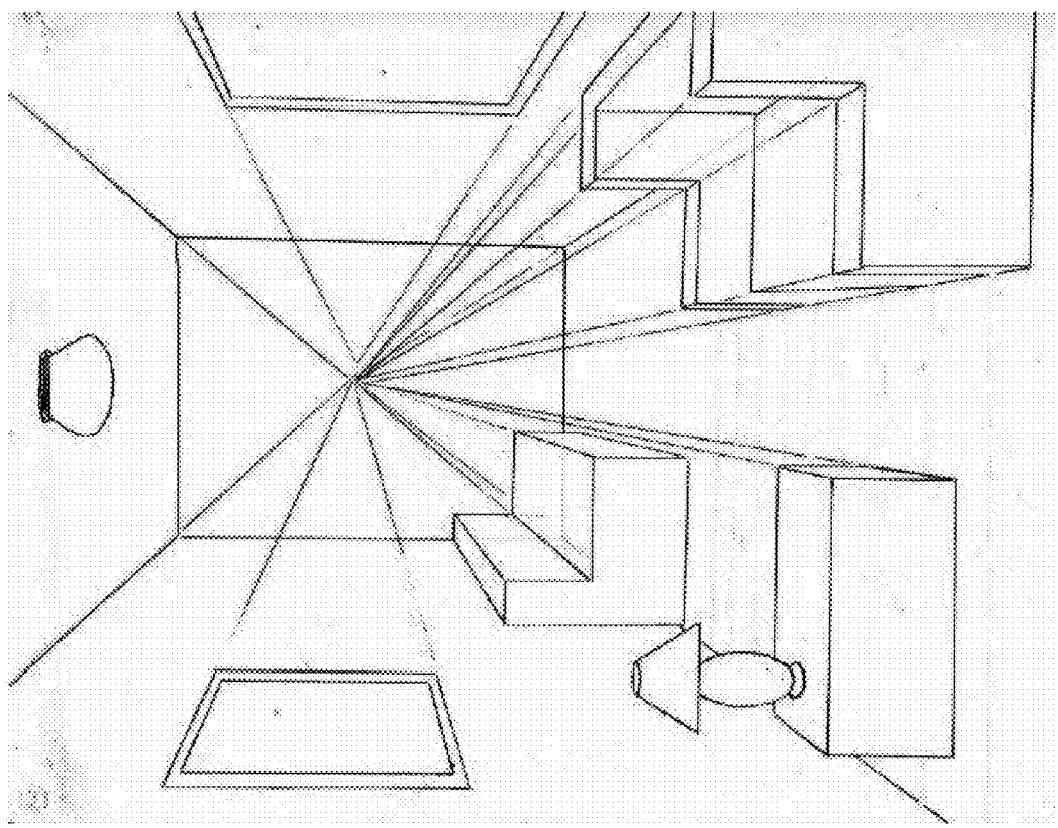
FIG. 5 illustrates another example depicting the one-point perspective, according to an embodiment of the present disclosure.

FIG. 3 illustrates an example 300 depicting the one-point perspective, according to an embodiment of the present disclosure. Similarly, FIG. 4 illustrates an example 400 depicting the one-point perspective, according to an embodiment of the present disclosure. Further, FIG. 5 illustrates an example 500 depicting the one-point perspective, according to an embodiment of the present disclosure. Referring to FIG. 3, FIG. 4, and FIG. 5, the one-point perspective may be understood as a perspective where it has one vanishing point on the horizon line. In FIG. 3, FIG. 4, and FIG. 5, all the lines are appearing to be vanishing at one point.

Figure 6:
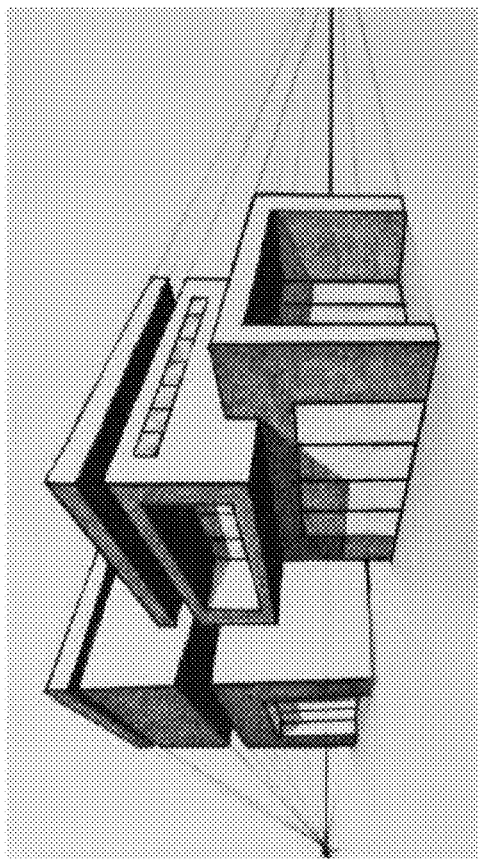
FIG. 6 illustrates an example depicting a two-point perspective, according to an embodiment of the present disclosure.
Figure 7:
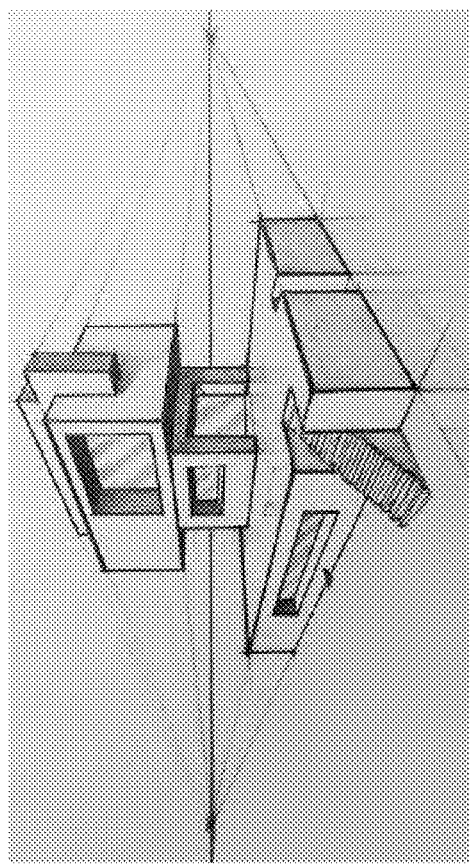
FIG. 7 illustrates another example depicting the two-point perspective, according to an embodiment of the present disclosure.
Figure 8:
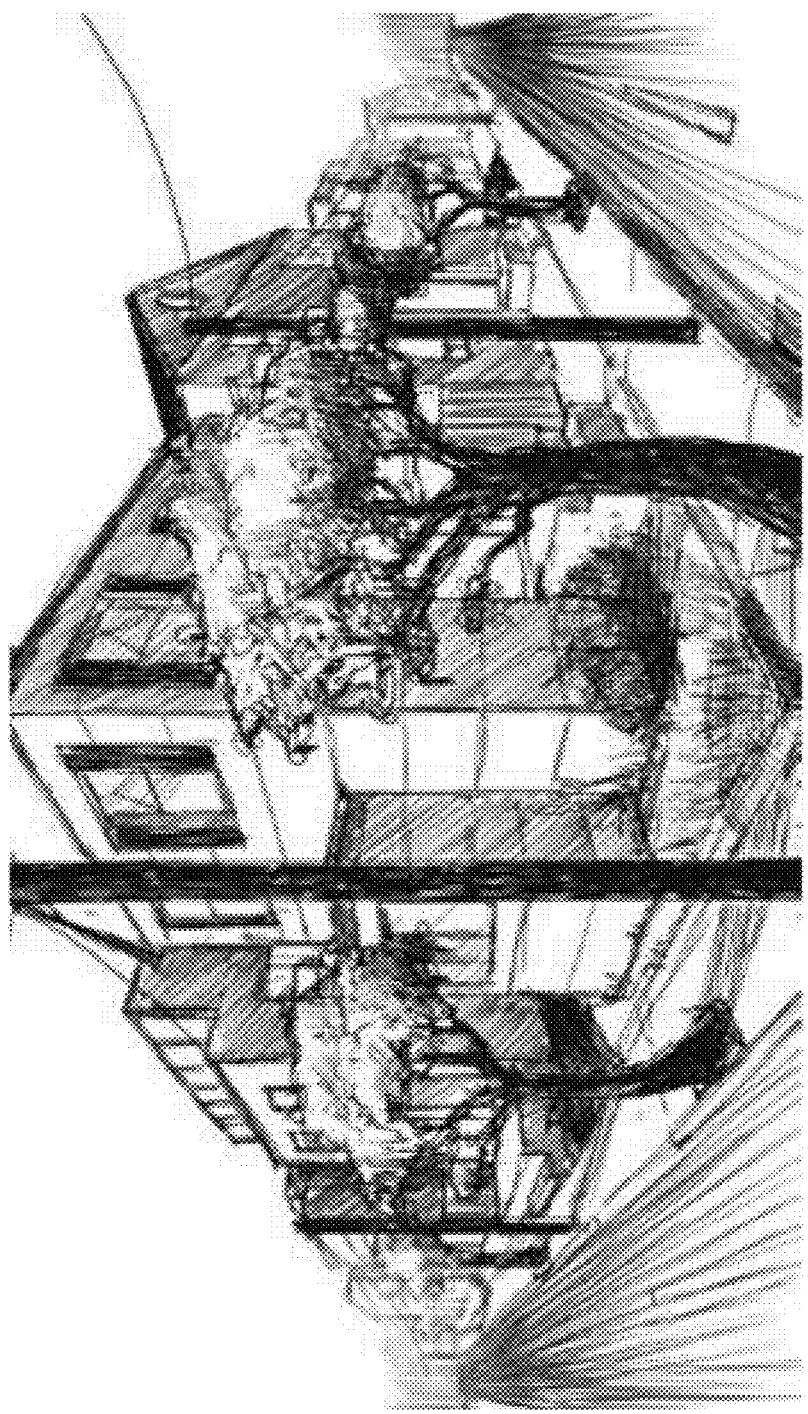
FIG. 8 illustrates another example depicting the two-point perspective, according to an embodiment of the present disclosure.

FIG. 6 illustrates an example 600 depicting the two-point perspective, according to an embodiment of the present disclosure. Similarly, FIG. 7 illustrates an example 700 depicting the two-point perspective, according to an embodiment of the present disclosure. Further, FIG. 8 illustrates an example 800 depicting the two-point perspective, according to an embodiment of the present disclosure. Referring to FIG. 6, FIG. 7, and FIG. 8, the two-point perspective may be understood as a perspective where it has two vanishing points. In FIG. 6, FIG. 7, and FIG. 8, all the lines are appearing to be vanishing at two points.

Figure 9:
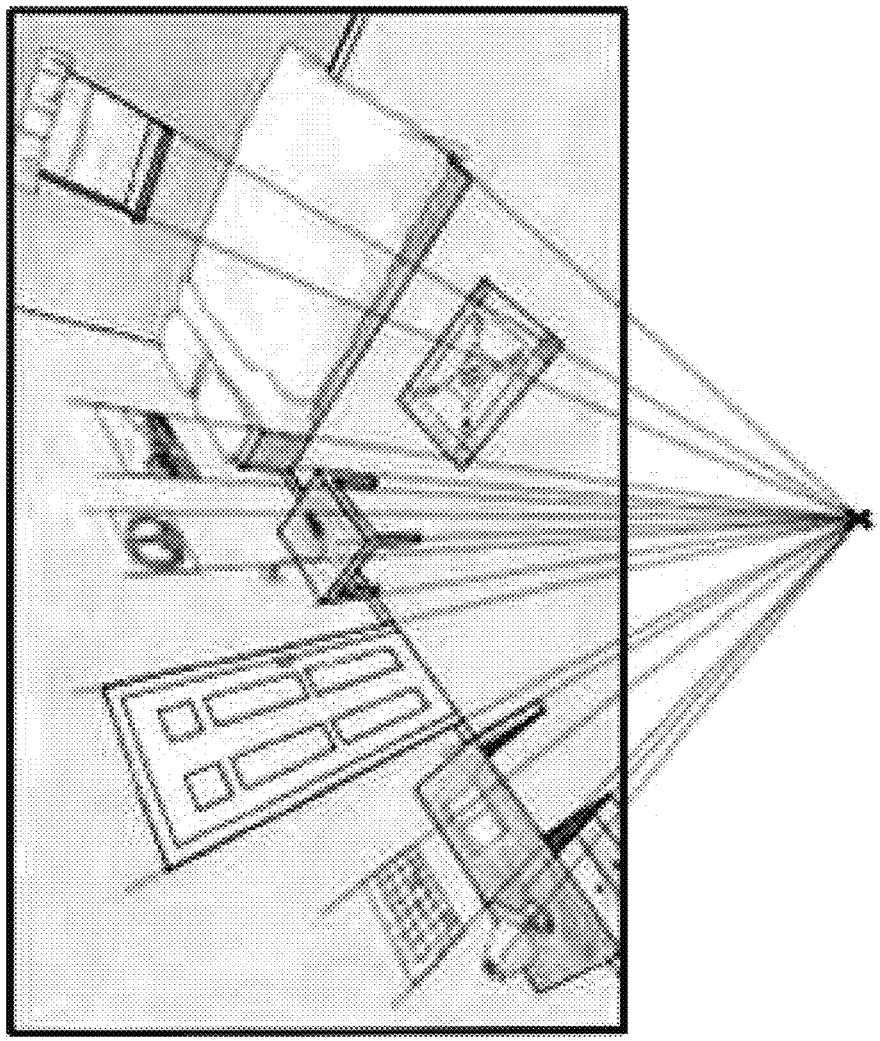
FIG. 9 illustrates an example depicting a three-point perspective, according to an embodiment of the present disclosure.
Figure 10:
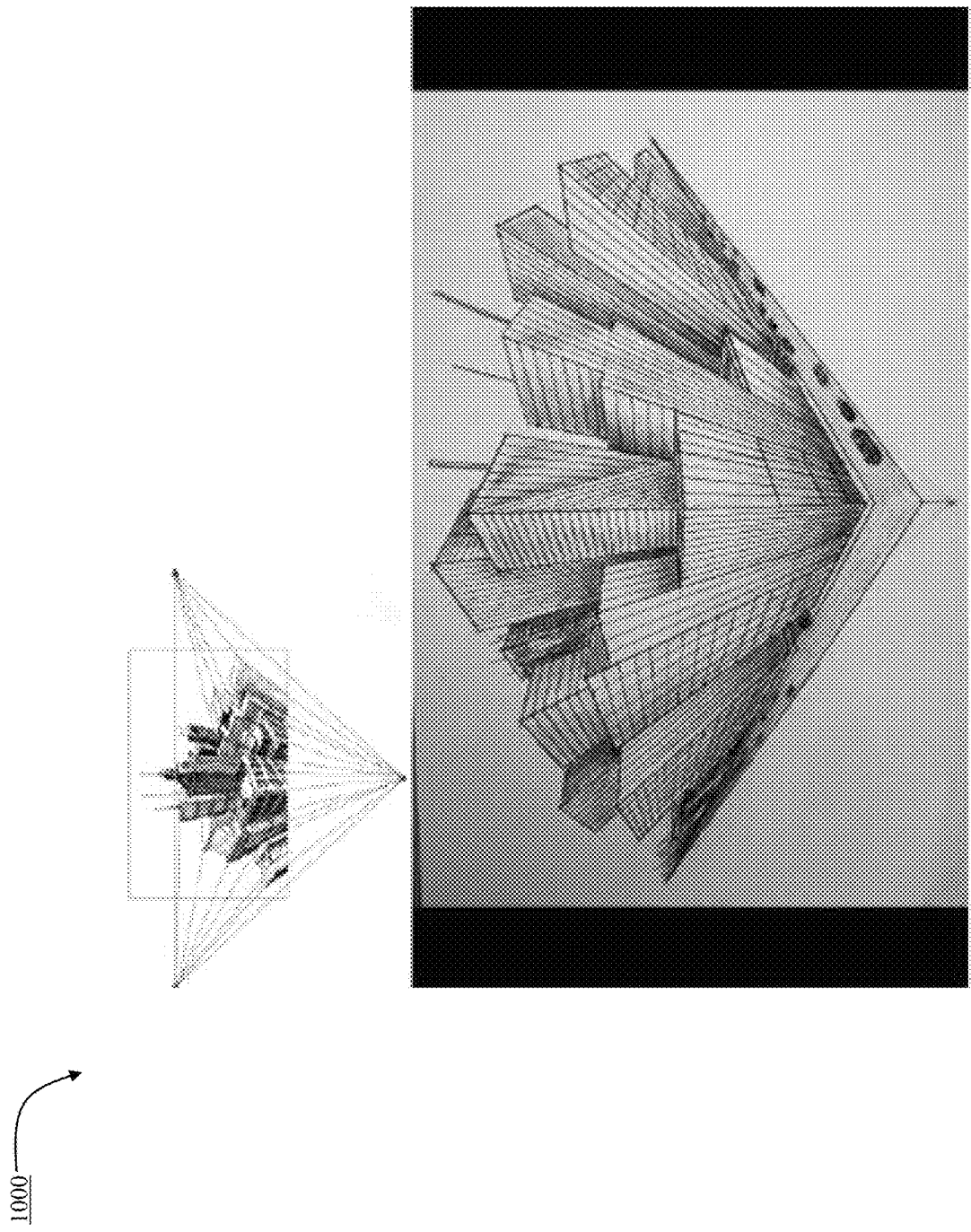
FIG. 10 illustrates another example depicting the three-point perspective, according to an embodiment of the present disclosure.

FIG. 9 illustrates an example 900 depicting the three-point perspective, according to an embodiment of the present disclosure. FIG. 10 illustrates an example 1000 depicting the three-point perspective, according to an embodiment of the present disclosure. The three-point perspective may be understood as a perspective where it has three vanishing points. This is also referred to as bird view.

In an embodiment, based on a type of a room and a type of products placed in the room, the system 102 may select one of the abovementioned perspectives for a view to be shown to the user during the virtual tour. In an embodiment, products that are recently added to the room may be given more consideration while selecting the perspective by the system 102, as the user may be more interested to explore the new products than the already existing products in the room. Therefore, the system 102 may determine a total area to be covered by a selected pathway in order to ensure that the user can explore all the products-of-interest during the virtual tour.

In an embodiment, the receiving module 210 may receive details relating to dimensions and interior structure of a specific portion of the predefined premises and the products-of-interest in the specific portion. Based on such details, the selecting module 216 may select a pathway to explore the specific portion by the user. Further, the generating module 212 may generate a one-point perspective view, a two-point perspective view, and a three-point perspective view of a field of view of the user. The one-point perspective view, the two-point perspective view, and the three-point perspective view may be understood as different perspectives of viewing a 3D object. The three generated views may be combined to form a comprehensive field of view for the user. Different combinations of these three views may provide differently styled pathways. Further, the generating module 212 may generate a score or en error for each of such pathways. If the score is below a predefined threshold score, the updating module 220 may update the pathway such that the updated pathway has a score above the predefined threshold value. On the other hand, if the error is above a predefined threshold error, the updating module 220 may update the pathway such the updated pathway has an error below than the predefined threshold error.

Figure 11:
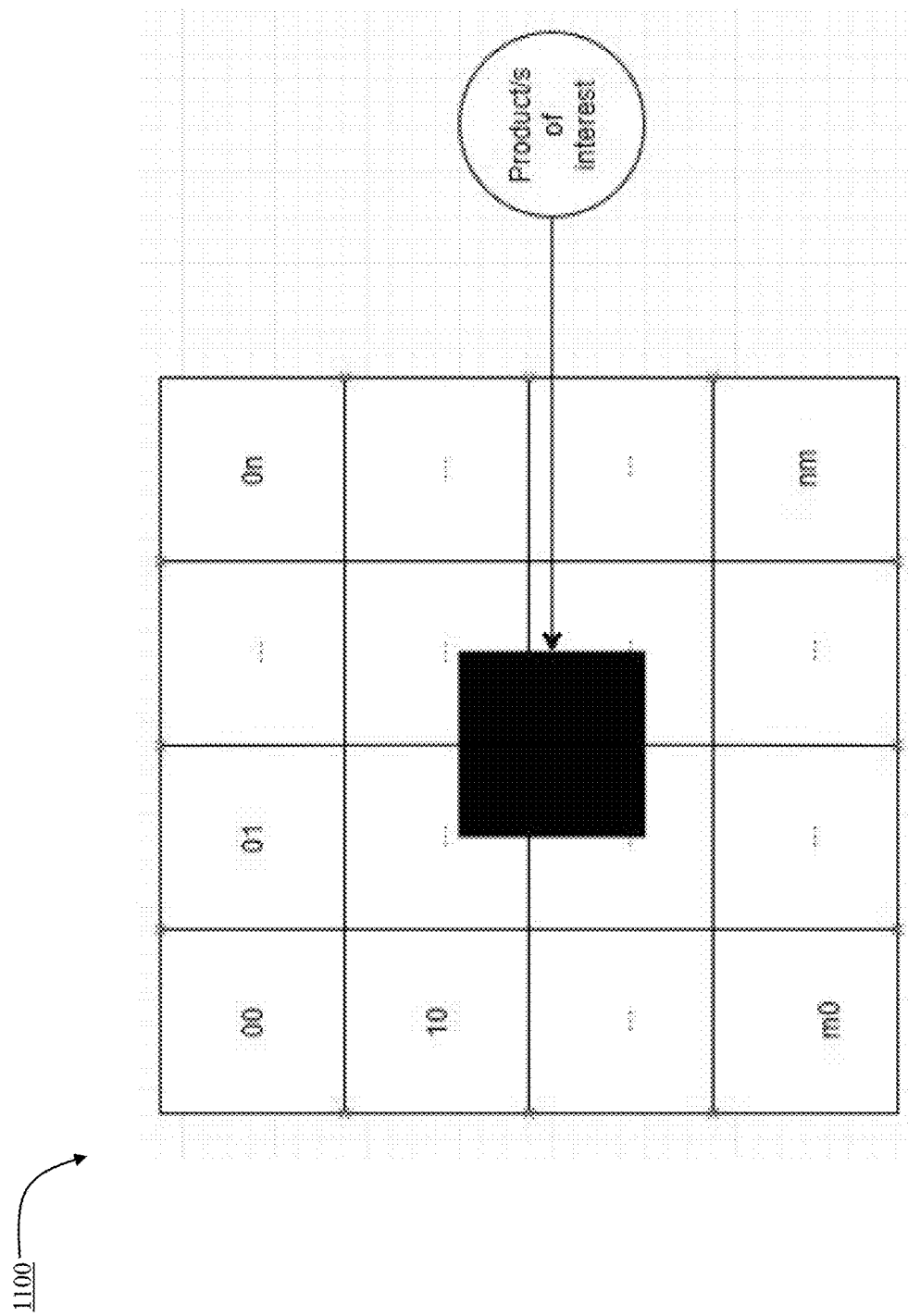
FIG. 11 illustrates an example depicting a specific area within the predefined premises divided in multiple grids and having a product-of-interest, according to an embodiment of the present disclosure.

In an example, given a set of nodes R determined from a grid of m×n, the generating module 212 may validate the set of nodes based on constraints $\alpha e + \beta e + \gamma e = 1$. FIG. 11 illustrates an example 1100 depicting a specific area within the predefined premises divided in multiple grids and having a product-of-interest, according to an embodiment of the present disclosure.

Where $\alpha e, \beta e, \gamma e$ represents the combination of the three perspectives (1, 2 and 3) and R={r1, r2, ..., rn}

1. The system 102 receives a set of nodes (path), V={v1, v2, ..., vn} and product/s of interest $\Phi$={$\Phi$1, $\Phi$2, ..., $\Phi$n}

2. Error E, may be understood as feedback, for V is determined as:

$$E = |\alpha e - \alpha| + |\beta e - \beta| + |\gamma e - \gamma|$$

Where, $$\alpha = 1/\tau \Sigma \alpha_i,\ \beta = 1/\tau \Sigma \beta_i,\ \gamma = 1/\tau \Sigma \gamma_i,$$

$$\tau = \Sigma \alpha_i + \Sigma \beta_i + \Sigma \gamma_i$$

And $$\alpha_i = \left|S(\vec{r}, \vec{\Phi})\right|,\ \beta_i = \left|S(\vec{r}, \vec{\Phi}) - 1\right|,\ \gamma_i = \left|1 - \left|S(\vec{r}, \vec{\Phi}) - \frac{1}{2}\right|\right|$$

And $$S(\vec{r}, \vec{\Phi}) = \sum_{i=1}^{n} \left((\vec{r}_i - \vec{\Phi}) \cdot (\vec{r}_i^k)\right)\ \text{and}\ \vec{r}_i^k = \vec{r}_{i+1}$$

Where

3. Total covered area by all the nodes in V is given by the equation, $$C = \sum_{i=1}^{n} \sum_{j=1}^{m} \frac{2}{\left|S_{vi}^h - \left((S_{vi}^{evik} - \Phi_j^{ejk}) + (S_{vi}^{evil} - \Phi_j^{ejl})\right)\right| + \left((S_{vi}^{evik} - \Phi_j^{ejk}) + (S_{vi}^{evil} - \Phi_j^{ejl})\right)}$$

4. Given E and C, minimize the function $f(C,E)$

The function f in step 4 is provided to the generating module 212, which updates the pathway to obtain an optimal path P.

e1, e2 in the above equations are not power but just indexes. They are edges of the viewport and the products-of-interest. Also, V does not necessarily contain all the nodes in the grid. It only contains whatever is provided by the selecting module 216

Further, C gives the area covered by a given path.

Objective for C:

Given the path P which consists of nodes, P={P1, ... Pn} and each of those nodes, Pi has viewport Sv with a given size and product/s of interest $\Phi$={$\Phi$1, ..., $\Phi$n}, the system 102 may calculate the area covered by the path.

Figure 12:
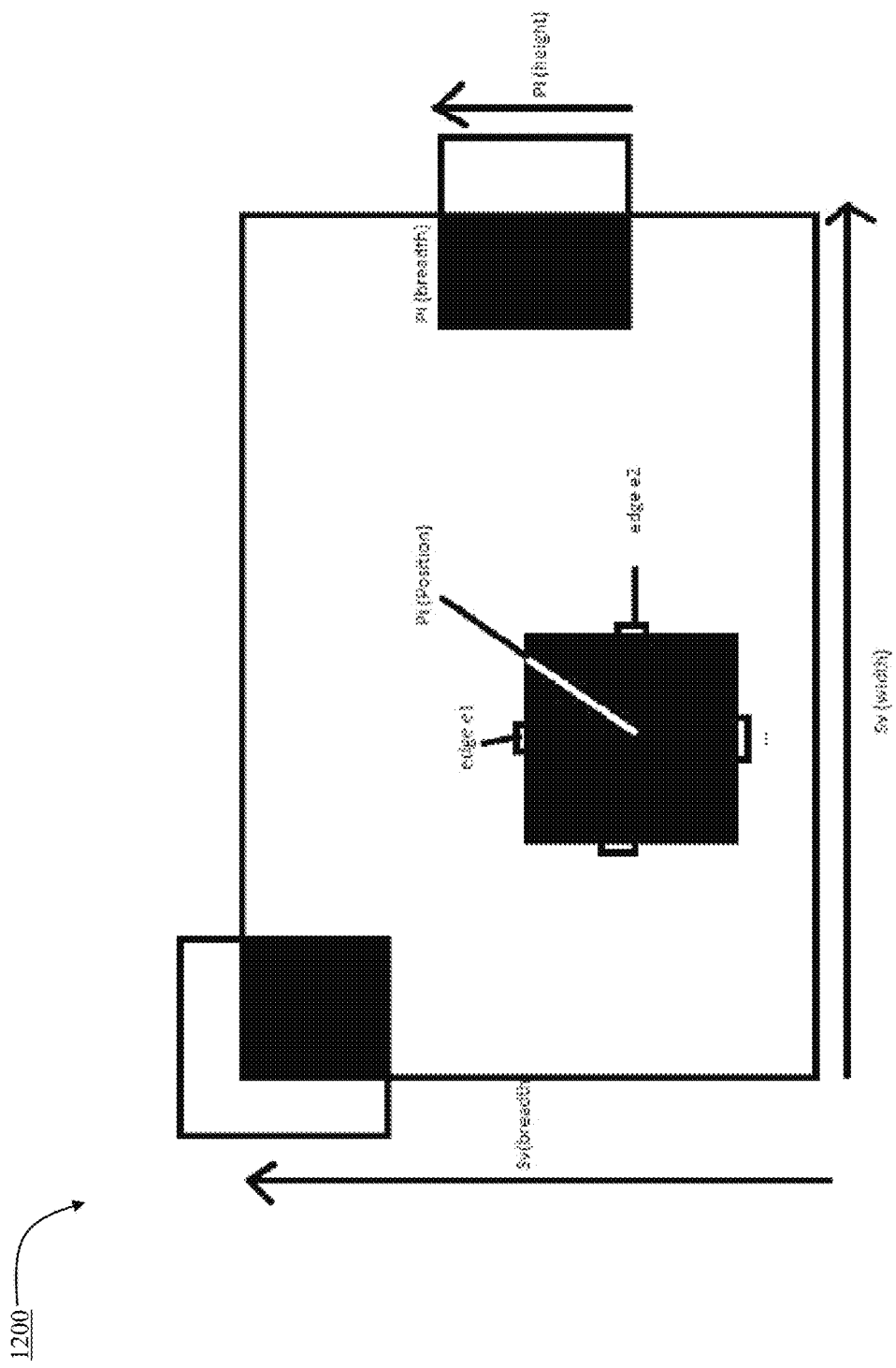
FIG. 12 illustrates an example depicting products-of-interest in a specific portion of the predefined premises, according to an embodiment of the present disclosure.

FIG. 12 illustrates an example 1200 depicting products-of-interest in a specific portion of the predefined premises, according to an embodiment of the present disclosure.

Viewport Sv has a size (height and breadth) and position Sv. Pi also has width and breadth and position Pi.

Sve Represents edge/s of the view port (Not the corners). View port has 4 edges.

Pie Represents edge/s of the node (Not the corners).

Given the position and size, the system 102 may determine the edge for viewport.

Given all these information, the amount of area covered by the viewport (how much of the products are covered in that viewport) may be determined by determining a distance between the edges of the viewport Sv and the product of interest Pi.

So for each viewport (meaning each node in the path), the system 102 may determine covered area against each product.

Figure 13:
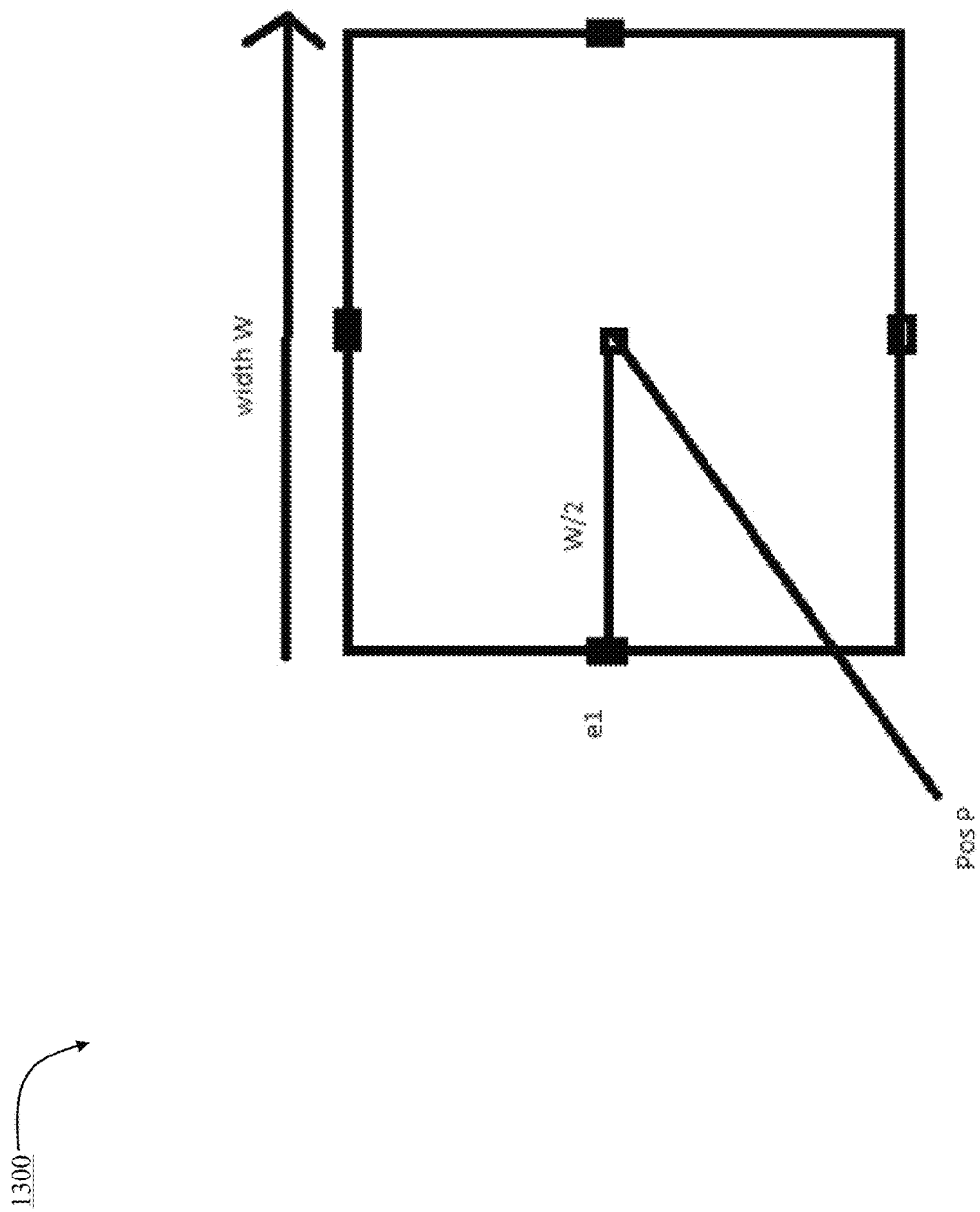
FIG. 13 illustrates an example depicting determining an edge, according to an embodiment of the present disclosure.

Each edge e may be determined by taking the width and height and placing edges on left, right, top, and bottom. Therefore, each edge is half the distance away from width or height. FIG. 13 illustrates an example 1300 depicting determining of the edge, according to an embodiment of the present disclosure.

Therefore, area covered by one viewport against one product may be determined by subtracting viewport size from two opposite edges of the viewport minus two opposite edges of the product. In the present example, opposite edges may be understood as edges on left-right or top-bottom.

$$C_{ij} = \frac{\left|S_{vi}^h - \left((S_{vi}^{evik} - \Phi_j^{ejk}) + (S_{vi}^{evil} - \Phi_j^{ejl})\right)\right| + \left((S_{vi}^{evik} - \Phi_j^{ejk}) + (S_{vi}^{evil} - \Phi_j^{ejl})\right)}{2}$$

Here $S_{vi}^{evik}$ is kth Edge of $i^{th}$ Sv. (There are at least 4 edges and n number of nodes, Sv)

And is $\Phi_j^{eji}$ is $l^{th}$ edge of $j^{th}$ Product-of-interest $S_{vi}^h$ is size of the $i^{th}$ viewport (height or width)

Therefore, area covered for all viewports against all the products may be determined as:

$$C = \sum_{i=1}^{n} \sum_{j=1}^{m} \frac{\left|S_{vi}^h - \left((S_{vi}^{evik} - \Phi_j^{ejk}) + (S_{vi}^{evil} - \Phi_j^{ejl})\right)\right| + \left((S_{vi}^{evik} - \Phi_j^{ejk}) + (S_{vi}^{evil} - \Phi_j^{ejl})\right)}{2}$$

Where n is the number of viewport (or nodes) and m is the number of product/s of interest.

One of the objectives is to maximize C. In another embodiment, when C is provided to the objective function, the objective of that function is to minimize the output. Therefore, for C to be maximized, for example, when provided to a function that needs to be minimized, reciprocal of C needs to be provided to the objective function which is 1/C.

So redefining C here, C=1/C, which gives the equation as:

$$C = \sum_{i=1}^{n} \sum_{j=1}^{m} \frac{2}{|S_{vi}^{h_i} - ((S_{vi}^{evik} - \Phi_j^{ejk}) + (S_{vi}^{evil} - \Phi_j^{ejl}))| + ((S_{vi}^{evik} - \Phi_j^{ejk}) + (S_{vi}^{evil} - \Phi_j^{ejl}))}$$

Evaluation of a Given Path in Terms of Points of View

Given a path P consisting of nodes n, the generation module 212 may determine the error as, $$E = |\alpha e - \alpha| + |\beta e - \beta| + |\gamma e - \gamma|$$

Let $\Phi$ be products of interest $\Phi = \{\Phi 1, \ldots, \Phi n\}$
Let P be the path containing nodes, P={P1, ..., Pn}
The generating module 212 may determine the error based on a path and a set of combination of expected point of perspectives depicted by $\alpha e$, $\beta e$, and $\gamma e$ corresponding to the one-point perspective, the two-point perspective, and the three-point perspective, respectively.

The combination of all three perspectives forms an overall style of point of perspectives. For example, the system 102 may determine percentage of each perspective to be used for generating a pathway.

$\alpha e$, $\beta e$ and $\gamma e$ have the following constraint,
$\alpha e + \beta e + \gamma e = 1$.

In an example, $\alpha e$, $\beta e$ and $\gamma e$ may be derived from the point perspective data, which may be a machine learning model or data collected by all the walkthroughs or the virtual tours. Further, values of $\alpha e$, $\beta e$ and $\gamma e$ may be different, based on the data and the path.

Figure 14:
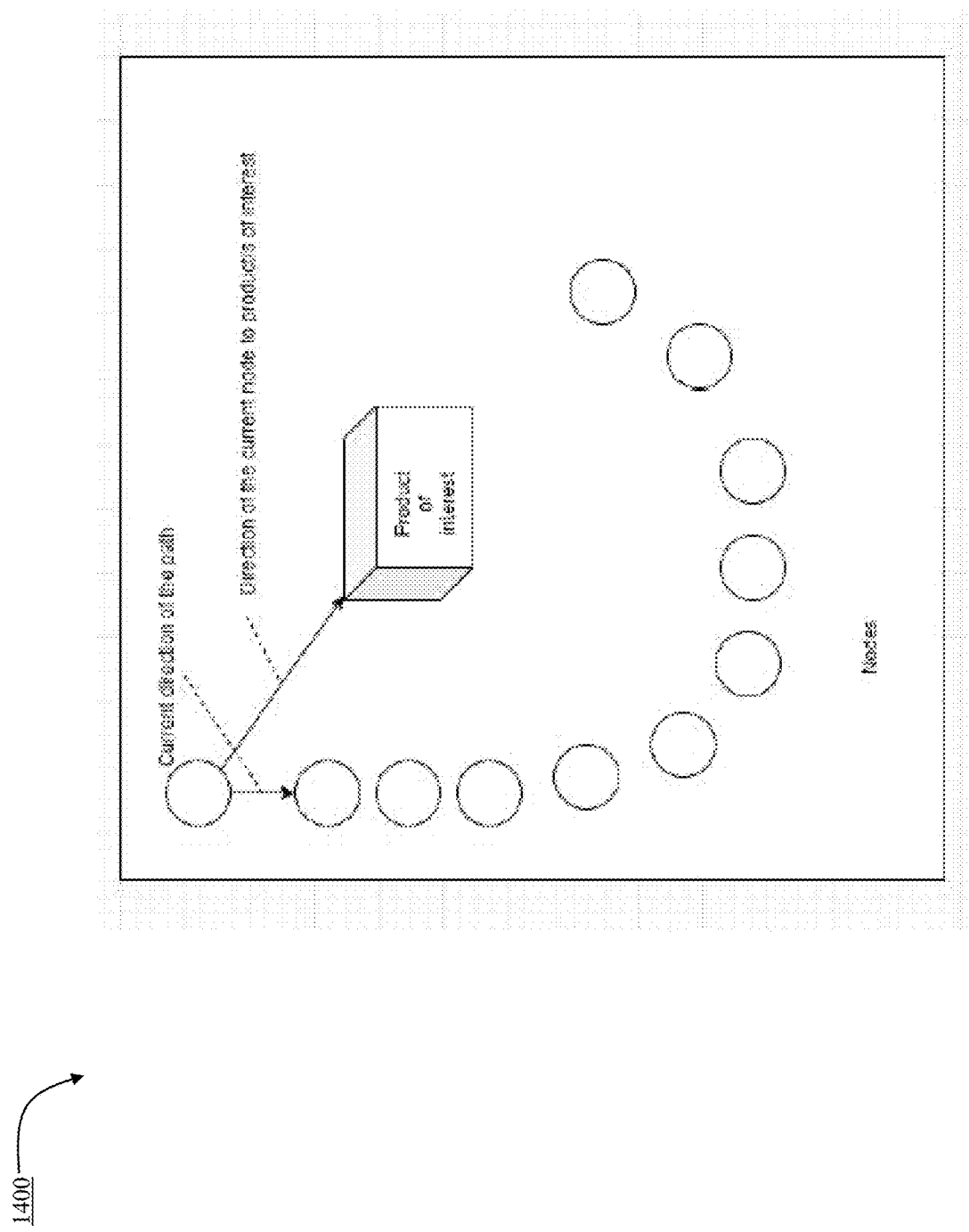
FIG. 14 illustrates an example depicting a current direction of path and a direction of a current node to the product-of-interest, according to an embodiment of the present disclosure.

Further, the system 102 may compare this expected point of perspective with the point of perspectives in the path. The system 102 may extract a plurality of points of perspectives in the path. In an embodiment, the system 102 may determine similarity between a current direction of the path and a direction of a current node to the product-of-interest. FIG. 14 illustrates an example 1400 depicting a current direction of path and a direction of the current node to the product-of-interest, according to an embodiment of the present disclosure.

In an example, the direction of the path with respect to the current node may be determined as:

$$\vec{P_l^k} = \vec{P_l} - \vec{P_{l+1}}$$

Where $\vec{P_l^k}$ is the current direction of the path;

$\vec{P_l}$ is the current position of the node; and $\vec{P_l}$ and $\vec{P_{l+1}}$ is the position of the next node.

The system 102 may determine the point of perspective of the path at a particular node, based on a comparison between these two vectors. For example, if it is the one-point perspective, the outcome may be −1 or +1. Further, if it is the two-point perspective, the outcome may be 0. Similarly, if it is the three-point perspective, the outcome may be 0.5.

The similarity between those two vectors is given by calculating the dot product of the vectors, which is given by, $$S(\vec{P_i}, \vec{\Phi_i}) = \sum_{j=1}^{n} \left( (\vec{P_i^j} - \vec{\Phi_i^j}) \cdot (\vec{P_k^j}) \right)$$

Where
j is the number of dimension of the vector. In this case, j is 3, i.e., x, y, and z. In other embodiments, it would generalize to n dimensions.

$(\vec{P_i^j} - \vec{\Phi_i^j})$ is direction of the current node to the product-of-interest. $\vec{P_k}$ is the current direction of the path. Given by:

$$\vec{P_k} = \vec{P_i} - \vec{P_{i+1}}$$

With the abovementioned information, the system 102 may extract all point of perspectives for this node.

$$\alpha_i = |S(\vec{P_l}, \vec{\Phi_i})|$$

$$\beta_i = |S(\vec{P_l}, \vec{\Phi_i}) - 1|$$

$$\gamma_i = 1 - |S(\vec{P_l}, \vec{\Phi_i}) - \frac{1}{2}|$$

Let $\tau$ be, $$\alpha = \sum_{i=1}^{n} \alpha_i \text{ And } \beta = \sum_{i=1}^{n} \beta_i \text{ and } \gamma = \sum_{i=1}^{n} \gamma_i$$

The system 102 may now determine the total error E for the path P as the difference between expected point of perspectives and calculated point of perspectives, which is given by:

$$E = |\alpha e - \alpha| + |\beta e - \beta| + |\gamma e - \gamma|$$

Therefore, now total covered area C and the point of perspective error E are determined. The system 102 may now minimize function f, given C and E as parameters.
$f(C, E)$ In an example, the function f may be subjected to any optimization techniques. This may be understood as a feedback to the system 102 for optimizing or updating the path.

Figure 15:
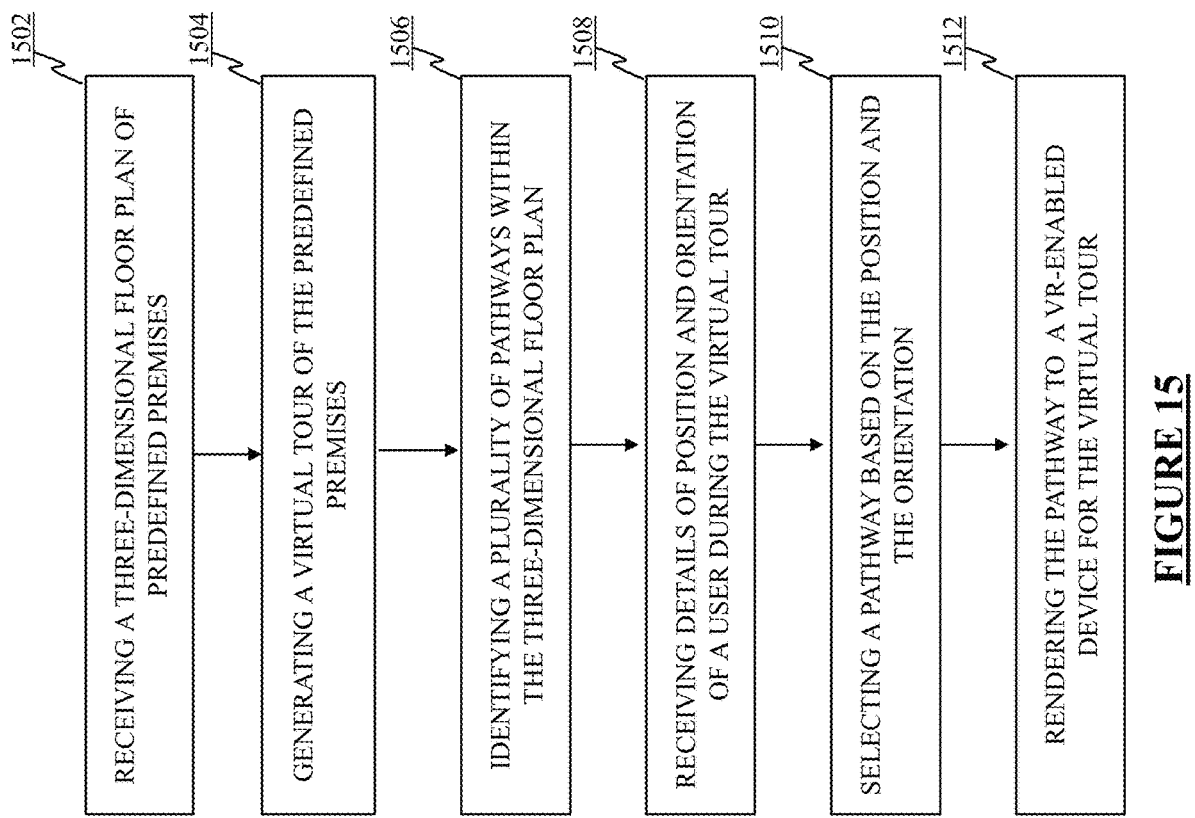
FIG. 15 illustrates a flow chart depicting a method of rending the pathway for the virtual tour of the predefined premises, according to an embodiment of the present disclosure.

FIG. 15 illustrates a flow chart depicting a method 1500 of rending the pathway for the virtual tour of the predefined premises, according to an embodiment of the present disclosure. In an embodiment, the method 1500 may be a computer-implemented method 1500. In an embodiment, the method 1500 may be executed by the processor 202. Further, for the sake of brevity, details of the present disclosure that are explained in details in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, are not explained in detail in the description of FIG. 15.

At a block 1502, the method 1500 includes receiving the three-dimensional floor plan of the predefined premises. In an embodiment, the receiving module 210 of the system 102 may receive the three-dimensional plan.

At a block 1504, the method 1500 includes generating the virtual tour of the predefined premises, based on the three-dimensional floor plan. The virtual tour may be generated by retrieving the plurality of images captured from the predefined angles within the three dimensional floor plan, and stitching the plurality of images to generate the virtual tour. In an embodiment, the generating module 212 may generate the virtual tour.

At a block 1506, the method 1500 includes identifying the plurality of pathways within the three-dimensional floor plan for exploring the predefined premises. A pathway is indicative of a visual, tactile or audio guidance provided to the user for navigating from a starting point to a destination point within the virtual tour. In an embodiment, the method 1500 includes identifying the plurality of pathways within the three-dimensional floor plan, based on identification of obstruction in the three-dimensional floor plan. The obstruction may include, but is not limited to, furniture, walls, stairs, and doors. In an embodiment, the identifying module 214 may identify the plurality of pathways.

At a block 1508, the method 1500 includes receiving the details pertaining to the position and orientation of the user during the virtual tour. The position and the orientation may be detected by the at least one sensor of the VR-enabled device 104 of the user. In an embodiment, the receiving module 210 may receive the details pertaining to the position and orientation.

At a block 1510, the method 1500 includes selecting a pathway, from among the plurality of pathways, based on the position and the orientation of the user. In an embodiment, the selecting module 216 may select the pathway.

At a block 1512, the method 1500 includes rendering the pathway to the VR-enabled device 104 for the virtual tour. In an embodiment, the rendering module 218 may render the pathway to the VR-enabled device 104.

In an embodiment, the method 1500 includes generating the score for each of the plurality of pathways. In such an embodiment, the method 1500 further includes rendering a pathway with the highest score to the VR-enabled device 104.

In an embodiment, the method 1500 includes receiving a user instruction indicative of one of adding, removing, and modifying an item during the virtual tour. In such an embodiment, the method 1500 then includes updating the pathway being rendered to the VR-enabled device 104, based on the user instruction.

In an embodiment, the method 1500 includes receiving the details indicative of the at least one predefined user gesture, based on detection of the at least one predefined user gesture by the at least one sensor of the VR-enabled device 104. The at least one predefined user gesture may include, but is not limited to, hand movements and eyeball movements. In such an embodiment, the method 1500 further includes updating the pathway being rendered to the VR-enabled device 104, based on the at least one predefined user gesture.

As would be gathered, the present disclosure offers a comprehensive approach for rendering pathways for virtual tours of a selected premises. First of all, the system 102 determines the pathways based on the dimensions and obstructions of the selected premises. Also, the system 102 considers the products-of-interest in the selected premises for generating the pathways. Therefore, the pathways are generated so that the user gets to explore all relevant portions of the selected premises. Moreover, depending on the position and orientation of the user, the system 102 ensures that a suitable pathway is selected to guide the user during the virtual tour. This would ensure a seamless experience to the user.

Further, the system 102 updates the pathways in real-time, based on detection of gestures and user movements. The gestures and user movements are continuously monitored by the system 102. Therefore, the possibility of any disruptions in the user experience is eliminated. In addition, the system 102 assigns score of each possible pathway that can be taken by the user from a first point to a second point during the virtual tour. The pathway having the score higher the predefined threshold is selected and rendered to the user ensuring an ergonomic and effective virtual tour of the user. Also, the system 102 has the capability of learning over a period of time and accordingly providing improved outcomes with each subsequent cycle of operation. Therefore, the system 102 and the method 1500 are comprehensive, flexible in implementation, efficient in operation, user-specific, ergonomics-driven, and cost-effective.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

I claim:

1. A method of rendering a pathway for a virtual tour of a predefined premises, the method comprising:
    receiving, by a receiving module, details comprising a three-dimensional floor plan of the predefined premises, dimensions of the predefined premises, a position and an orientation of a user during the virtual tour, wherein the position and the orientation are detected by at least one sensor of a Virtual Reality (VR) enabled device of the user;
    generating, by a generating module, the virtual tour of the predefined premises, based on the received details and a selected field of view of the user, the selected field of view comprising at least one of a one-point perspective, a two-point perspective, and a three-point perspective, wherein the field of view of the user is selected based on a type of a space of the predefined premises and a type of product from a product of interest placed in the type of space, wherein the virtual tour is generated by:
        retrieving a plurality of images captured from predefined angles within the three-dimensional floor plan; and
        stitching the plurality of images to generate the virtual tour;
    identifying, by an identifying module, a plurality of pathways within the three-dimensional floor plan for exploring the predefined premises based on the dimensions of the predefined premises, the product of interest, and an identification of an obstruction in the three-dimensional floor plan, wherein each pathway is indicative of a visual, a tactile, or an audio guidance provided to the user for navigating from a starting point to a destination point within the virtual tour;
    determining, by the generating module, an error for each of the plurality of pathways, based on a comparison of calculated point of perspectives of each of the plurality of pathways and expected point of perspectives, wherein the calculated point of perspectives and the expected point of perspectives comprise at least one of the one-point perspective, the two-point perspective, and the three-point perspective;
    selecting, by a selecting module, a pathway, from among the plurality of pathways, based on the position and the orientation of the user and the determined error of each of the plurality of pathways;
    updating, by an updating module, the selected pathway by optimizing the corresponding determined error of the selected pathway based on a predetermined threshold error; and
    rendering, by a rendering module, the selected updated pathway showcasing the product of interest based on the selected field of view of the user to the VR-enabled device for the virtual tour.

2. The method as claimed in claim 1, wherein the obstruction comprises at least one of furniture, walls, stairs, and doors.

3. The method as claimed in claim 1, further comprising:
receiving, by the receiving module, a user instruction indicative of at least one of adding, removing, and modifying an item during the virtual tour; and
updating, by the updating module, the selected pathway being rendered to the VR-enabled device, based on the user instruction.

4. The method as claimed in claim 1, further comprising:
receiving, by the receiving module, the details indicative of at least one predefined user gesture, based on detection of the at least one predefined user gesture by the at least one sensor of the VR-enabled device, wherein the at least one predefined user gesture comprises one of hand movements and eyeball movements; and
updating, by the updating module, the selected pathway being rendered to the VR-enabled device, based on the at least one predefined user gesture.

5. The method as claimed in claim 1, further comprising monitoring, by a learning module, the receiving module, operation of the generating module, identifying module, the selecting module, the rendering module, and the updating module, using a machine learning model to enhance an outcome related to the generation of the virtual tour of the predefined premises.

6. The method as claimed in 1, further comprising determining, by the generating module, a total area represented by the selected pathway based on a size of a view port of each node of the plurality of nodes of the selected pathway and a size of the product of interest.

7. A system of rendering a pathway for a virtual tour of a predefined premises, the system comprising:
a receiving module adapted to receive details comprising a three-dimensional floor plan of the predefined premises, dimensions of the predefined premises, a position and an orientation of a user during the virtual tour, wherein the position and the orientation are detected by at least one sensor of a Virtual Reality (VR) enabled device of the user;
a generating module in communication with the receiving module and adapted to generate the virtual tour of the predefined premises, based on the received details and a selected field of view of the user, the selected field of view comprising at least one of a one-point perspective, a two-point perspective, and a three-point perspective, wherein the field of view of the user is selected based on a type of a space of the predefined premises and a type of product from a product of interest placed in the type of space, wherein the virtual tour is generated by:
retrieving a plurality of images captured from predefined angles within the three-dimensional floor plan; and
stitching the plurality of images to generate the virtual tour;
an identifying module in communication with the generating module and adapted to identify a plurality of pathways within the three-dimensional floor plan for exploring the predefined premises based on the dimensions of the predefined premises, the product of interest, and an identification of an obstruction in the three-dimensional floor plan, wherein each pathway is indicative of a visual, a tactile, or an audio guidance provided to the user for navigating from a starting point to a destination point within the virtual tour;
a selecting module in communication with the receiving module and adapted to select a pathway, from among the plurality of pathways, based on the position and the orientation of the user and the determined error of each of the plurality of pathways;
an updating module in communication with the selecting module and configured to update the selected pathway by optimizing the corresponding determined error of the selected pathway based on a predetermined threshold error; and
a rendering module in communication with the selecting module and adapted to render the selected updated pathway showcasing the product of interest based on the selected field of view of the user to the VR-enabled device for the virtual tour.

8. The system as claimed in claim 7, wherein the obstruction comprises at least one of furniture, walls, stairs, and doors.

9. The system as claimed in claim 7, wherein:
the receiving module is adapted to receive a user instruction indicative of at least one of adding, removing, and modifying an item during the virtual tour; and
the updating module is in communication with the receiving module and the generating module and adapted to update the selected pathway being rendered to the VR-enabled device, based on the user instruction.

10. The system as claimed in claim 7, wherein:
the receiving module is adapted to receive the details indicative of at least one predefined user gesture, based on detection of the at least one predefined user gesture by the at least one sensor of the VR-enabled device, wherein the at least one predefined user gesture comprises one of hand movements and eyeball movements; and
the updating module is in communication with the receiving module and the generating module and adapted to update the selected pathway being rendered to the VR-enabled device (104), based on the at least one predefined user gesture.

11. The system as claimed in claim 7, further comprising a learning module configured to communicate with the generating module, identifying module, the selecting module, the rendering module, and the updating module and monitor operation of the generating module, identifying module, the selecting module, the rendering module, and the updating module, using a machine learning model to enhance an outcome related to the generation of the virtual tour of the predefined premises.

12. The system as claimed in claim 7, wherein the generating module is configured to determine a total area represented by the selected pathway based on a size of a view port of each node of the plurality of nodes of the selected pathway and a size of the product of interest.

* * * * *